UNITED STATES PATENT OFFICE.

ANDREW THOMA, OF CAMBRIDGE, MASSACHUSETTS, ASSIGNOR TO THOMA CORPORATION, OF PORTLAND, MAINE, A CORPORATION OF MAINE.

CEMENT COMPOSITION AND PROCESS OF MAKING THE SAME.

No. 855,868.     Specification of Letters Patent.     Patented June 4, 1907.

Original application filed October 2, 1905, Serial No. 280,957. Divided and this application filed October 24, 1906. Serial No. 340,337.

*To all whom it may concern:*

Be it known that I, ANDREW THOMA, a citizen of the United States, residing at Cambridge, in the county of Middlesex and State of Massachusetts, have invented an Improvement in Cement Composition and Process of Making the Same, of which the following description is a specification.

This is a division of my original application Serial No. 280,957, filed October 2, 1905.

My invention, although primarily intended for factory use, provides a cement, and method of making the same, having a wide field of usefulness. Primarily I intend my cement as a substitute for the present volatile, oxidizing and transitory rubber cement so commonly used in modern shoe factories, and with this in view I provide a cement having no solvent or volatile ingredient and no oxidizing agent, but characterized by the permanent character of its base or vehicle. It does not change on repeated reheating, and is at the same time always pliable, waterproof and fireproof, and capable of meeting all the exacting requirements of a shoe factory.

In making shoes it is desirable to use rubber or gutta percha, but on account of the volatile and inflammable nature of the naphtha-solvents in these cements, it is customary either to deliver fresh cement each morning or to keep the cement in an out-building away from the main factory, where it often rapidly wastes and deteriorates and in time of frost the rubber is deadened or its sticking quality injured by the cold; and in use, is slow to dry (especially in humid weather,) expensive, wasteful, will not stick wet leather, and because of its stringy character it cannot be used neatly. Accordingly, while retaining the advantages or characteristics of the gutta percha I have removed all the above disadvantages by eliminating entirely the solvent and non-cementitious elements.

My cement is not only non-volatile and non-inflammable, and self-sustaining so that it may be kept exposed in quantity in the factory ready for either future or instant use, but is characterized by being brought to a short condition so that it does not become stringy or smeary, but sets instantly, and, as its entire body consists of cementitious matter (as distinguished from the commonly employed cement, which contains only 6% of cementitious matter,) a very fine film will answer, inasmuch as each particle is essentially cementitious or sticky. It is pliable, practically changeless, and suffers no loss in quantity or quality through evaporation (not true of other waterproof cements.) Applied in a thin layer as described, it does not harden or stiffen so as to fracture the coating, but remains permanently in its original condition.

I provide a predominating or controlling medium or base of non-oxidizing adhesive material such as wax tailings, (a residuum of petroleum) or stearin pitch (a residuum of stearin,) which are almost odorless and unchangeable, and with this base I combine by means of heat, as distinguished from a mechanical union, (the latter being referred to later, although not the preferred method,) vegetable gums such as tuna, pontianac, gutta percha, balata, etc. raised to a sufficient heat to cease to be oxidizing and to become non-oxidizing or atmospherically resistant under conditions of use. This develops the cementitious character of these ingredients excessively, and the result of the melting heat is that they retain this excessive cementitious character and impart it permanently to the predominating base and other ingredients. The latter I will set forth more at length in connection with the various uses and variations contemplated for my invention.

Vegetable gums and resins as a rule contain oxidizing elements, which tend gradually to destroy the first asserted natural elements, or at best to make them unstable. The resins contain essential oils which when exposed to the atmosphere are constantly evaporating, rendering the mass hard and brittle, while the gums are charged with drying destructive resins, waxes, oils, etc., which, under the influence of the atmosphere, quickly destroy the life and value of the first asserted qualities of adhesion, toughness, elasticity and pliability. I neutralize or overcome this oxidizing and unstable matter by a predominating amount of material which is fundamentally opposed to the self-destructive elements and is at the same time not only protective in its nature but is disintegrating, enveloping, self-assertive and controlling, adhesive, and cohesive or binding. Under the heating process and melting together, the pernicious elements are evaporated and removed, and the solids are separated from each other and then united with a non-oxidizing element, and the latter dissolves certain parts, unites with and envelops others, and smooths and overpowers the otherwise unstable and unworkable elements, so that thereby this neutralizing and reclaiming base gains, by the dissolution of the gums, structural strength, toughness, adhesiveness, and binding qualities. These are the sought-for qualities for my use.

This cement is not subservient to water, and is extremely water-repellent, not only preventing the entrance of water into the leather which it has been applied to, but when applied to damp leather being capable, under certain conditions, of repelling or driving out and replacing the water sufficiently to enable the cement to obtain a strong adhesive grip upon the fibers of the leather, so that it may be used directly on tempered or moistened leather, which has not been possible with the previous leather cements. Also it affords a coating which is firm and stable, by which I mean that it will not run, blur or smooch, so that it can be applied, for instance, to shoe soles before soaking and yet after said soaking process, it will still serve to stick them instantly and surely to the welt or other part as desired.

In modern shoe factories the demands are for quickness, effectiveness and economy, and accordingly I have sought for ingredients which are relatively inexpensive, and yet when combined in the manner and proportions hereinafter stated form a permanent or unchangeable mass, tacky in character, and hence readily applicable in a very thin layer, which instantly penetrates into and unites with the surface fiber of the leather so as not to be undermined or repelled by water, grease or sizing (met commonly in leather, especially split and viscolized leather and the like.)

I have found that, under the action of heat, the sticky residuum of petroleum, known as wax tailings, is an excellent solvent of certain other ingredients hereinafter mentioned, and that while undergoing this heating process in the presence of said solvent the oxidizing and disintegrating character of these ingredients is changed or overcome and an unexpected stickiness results which reinforces and unites with the stickiness of the base as a permanent and the most marked characteristic of the compound.

Besides the gums already mentioned, I introduce mineral tar and asphalts to give a hardening and toughening character, and under a strong heat I can do this without detracting from the normal character of the predominating base and other ingredients. They serve to harden the extremely fluid wax tailings up to a tough, firm, pliable mass. These may be used to advantage for a base or a part of the base, especially the tarry by-products of coal distillation and the low-melting asphalt residuums from the various petroleum refining processes (and which I have included among the varieties of wax tailings.) Tarry fluids and oils are objectionable on account of their odor, and as one of the features which I have sought for is an odorless cement (having the essential characteristics enumerated) I prefer the petroleum residuums, which are odorless, but I do not limit myself in all cases thereto. Also I have found that rosin can be safely used in this connection to harden and toughen the mass, as I find that, under the influence of the hot, melted wax tailings the oxidizing influence is overcome or neutralized so that it cannot subsequently assert itself. The wax tailings cannot be obtained in uniform condition, but varies greatly in the market from a thin to a thick viscous mass, and it will be understood that I will vary the amount of hardening and toughening ingredients accordingly, so as to produce the required toughness, relative hardness or self-sustaining capacity, and strongly adherent qualities.

The wax tailings or sticky resinous residuum of petroleum from different oil fields differs very decidedly, but it may readily be brought to substantial uniformity by supplying any deficiency or by adding required ingredients, and it can be originally distilled so as to develop and retain the essential characteristics for my purpose, so as not to require any tempering or treating, but ordinarily for proper results I employ 50 to 60 parts of the wax tailings to about 25 parts of the resinous hardening mass and about 20 parts of the gummy, elastic body. For example, according to the varying conditions, I use 60 parts of wax tailings to 30 parts of rosin and 10 parts of tuna gum, or to 20 or 25 parts of rosin and 20 or 25 parts of pontianac; or 50 parts of wax tailings to 25 parts each of rosin and stearin pitch; or 50 parts of wax tailings to 25 parts each of stearin pitch and hydro-carbon; (such as is offered in the market, of a natural origin, as those known in the trade and market by the names of kapak, gilsonit, or manjak, etc., or of an artificial or partly artificial origin, as mineral rubber, hard tarry distillate of petroleum, etc.) or 20 parts of linseed oil (boiled to a semi-viscous state) to 30 parts of rosin or the like, 30 parts of stearin pitch and 20 parts of boiled pontianac; or 20 parts of linseed oil (boiled as before) to 30 parts of rosin or resinous pitch, 20 parts of stearin pitch, and 15 parts each of gutta percha and pontianac (both boiling); or 50 parts of wax tailings to 25 each of rosin and gutta percha, the latter boiling as before. In each case the ingredients are put together by heat, being maintained under heat until reduced to a smooth flowing liquid. In case the stearin pitch is used alone as a base, the softer variety is used, as it is not as free flowing as the wax tailings. The proportions of the latter ingredient in the above formulæ are those I have found desirable with the product sold in the open market as "hard wax tailings" from the refineries at Bayonne, N. J., which is the variety of petroleum residuum that meets my requirements best. These formulæ are adapted to the more complete embodiment of my invention, in which I have succeeded in producing a compound of such a consistency and character that it is self-sustaining when *en masse* so that it can be packaged in a self-sustaining body when supported by an enveloping layer of tissue paper, plaster of paris, whiting, lime, talc or the like. This self-packaging feature I do not herein claim, as it is duly claimed in my original application Ser. No. 280,957 filed Oct. 2, 1905, from which the present case is a divisional application. The resinous hardening mass aids materially in producing the required quick-setting character and in preventing the cement from remaining plastic, as desired for shoe sole work, but which is not needed for shoe upper work. The vegetable gums, reduced by heat to a sticky, strongly adhesive state supply an element of elasticity (as distinguished from a putty-like or latent stickiness). And all the ingredients, under the heat-treatment, contribute to the prominent cementitious character of the cement with a resultant absence of tendency to smear or smooch, to run and to become stringy. This contributes neatness and economy in use, and the non-oxidizing and atmospherically resistant character of my composition, taken with its strength and pliability gives great endurance or toughness, and permanency of condition and body or package, as well as permanency of adhesion.

My process of manufacture is distinguished from the usual method, in which a gummy mass, usually gutta percha is cut by solvents such as bisulfid of carbon or naphtha, in that I cut the gummy mass (which I use for giving toughness or strength), by a heated sticky, non-oxidizing base. I not merely heat the base, but I go further than that and maintain the heat until a thorough disintegration of the gum is produced, so that it is brought to the most perfect condition for the purpose.

While I have described my invention in all its preferred details, it will be understood that, excepting as expressly limited in certain of the claims, I am not restricted thereto. I have emphasized using heat as the initial mixing means, as by far the best results are thus obtained, and for the same reasons I prefer to employ heat, as distinguished from mechanical means, not only for mixing but for applying the cement. On the other hand mechanical mixing, as for instance by mills such as are used in rubber factories in which the thorough intermixing of the components of my composition is wholly due to the action and friction of the rolls, also produces a compact form of the cement, as the vegetable gums retain their natural consistency and toughness, and allow an easy shaping into parcels and handling commercially. I employ a larger proportion of the vegetable gum when the mechanical mixing alone is employed for securing better and permanent adhesion, as in cementing channels. In other cases the non-oxidizing adhesive constituents act as a stiffening agent on the gummy elastic constituents, with which they are so thoroughly incorporated as to render the otherwise unworkable vegetable gummy mass permanently workable, and, when united with the non-oxidizing stiffening agent, permanently sticky and non-oxidizing in tendency.

My cement is further distinguished by being extremely fluid when heated, permanently cementitious, as distinguished from the various well known gutta percha cements, which are thick when heated, and require local application of heat, as by a hot iron, in order to become effective, and even then they are only transiently or momentarily effective. Also my cement employs a base with a low melting point and non-oxidizable, such as wax tailings, toughened or hardened and given the right consistency so as to be adaptable for use with shoe uppers, linings and soles, for holding the parts in the various preparatory stages prior to, and during stitching etc., it being common to apply the cement in practice even days before the parts are subsequently joined in the final shoe. It will be apparent that an oxidizing cement, and especially one incapable of use when cold or under damp conditions would be useless under such circumstances.

My cement is not only non-oxidizing or unchangeable and permanently adhesive and tacky in the ordinary sense, but it is permanently binding in its nature, by which I mean that it is sufficiently penetrating, strong, quick and active in its stickiness to cling not only to the surface to which it is applied, but to an opposite surface pressed against the same, thereby binding said two surfaces immovably and permanently together. It is distinguished in this respect from rubber cements, which cling strongly to the superposed surface and weakly to the surface to which originally applied, so that they are free to peel off from the original surface.

In use the leather parts which have been coated with my cement may be joined immediately, or they may remain for days when the cement has cooled before being joined. For instance, in cementing soles, the cement on account of its penetration instantly envelops the outer fibers producing a tenacious and permanently active surface coating, so that the thorough subsequent soaking of the soles in water to soften them for the final laying and shaping process, cannot dislodge or undermine the cement. I have set this forth at length in my copending application Serial No. 328,046 filed July 27, 1906, where the same is claimed broadly. My cement is preferably supplied hot, and only a very thin film is necessary, thereby securing economy and effectiveness, and as it sets at once I secure quickness. It sets quickly because it cools rapidly on account of its low specific heat, and, although it is a non-conductor of heat, yet when spread in contact with a heat absorbing surface or a surface of a lower temperature, it parts instantly with its relatively small amount of heat energy, i. e., it sets at once.

Having described my invention, what I claim as new and desire to secure by Letters Patent, is:

1. A cement, consisting of an atmospherically resistant, permanently adhesive mass, short when hot, low-melting, and quick-setting when allowed to cool quickly.

2. A cement, consisting of a non-volatile, non-oxidizing, permanently adhesive and binding body thinly fluid when heated, low melting, and permanently cementitious under all conditions.

3. A cement, consisting of a non-volatile, non-oxidizing, non-inflammable, permanently adhesive and binding body, thinly fluid when heated, low melting, and permanently waterproof when applied in use.

4. A cement, consisting of a non-oxidizing, permanently sticky base combined with an elastic gum and permanently sticky when cold.

5. A cement, consisting of a non-oxidizing, permanently tacky base combined with an elastic gum and a hardening and toughening medium.

6. A cement, consisting of a non-oxidizing, permanently sticky base combined with a hardening and toughening medium, the whole being normally semi-solid or in a substantially self-sustaining state when cold.

7. A cement, consisting of a non-oxidizing, permanently adhesive, odorless mass, short when hot, low-melting, and quick-setting when allowed to cool quickly.

8. A cement, consisting of a non-oxidizing, odorless, permanently sticky base, combined with an elastic gum, and a hardening and toughening medium.

9. A cement, consisting of wax tailings combined with a vegetable elastic gum.

10. A cement, consisting of wax tailings combined with stearin pitch and a vegetable elastic gum.

11. A cement, consisting of wax tailings combined with a hardening and toughening agent and a vegetable elastic gum.

12. A cement, consisting of wax tailings combined with rosin and a vegetable elastic gum.

13. A cement, consisting of wax tailings combined with rosin and boiled gutta percha.

14. A cement, consisting of wax tailings, stearin pitch, and gutta-percha boiled together.

15. The process, consisting of combining a gummy elastic mass with a non-oxidizing adhesive mass by so intimately and thoroughly mixing and incorporating one into the other as to overcome the oxidizing tendency of the gummy mass and impart thereto a permanent workable stickiness.

16. The process, consisting of thoroughly mixing together a non-oxidizing, adhesive, low-melting mass and a gummy elastic mass by commingling the one with the other until the natural tough consistency of the gummy mass has been neutralized by the low-melting softening influence of the non-oxidizing mass and the oxidizing tendency of the gummy mass has been neutralized and a permanent workable stickiness imparted thereto.

17. The process, consisting of taking a base of non-oxidizing adhesive material in preponderating amount and combining it by heat with a gummy elastic mass, and maintaining the heat until any oxidizing tendency of the latter is permanently overcome and a permanent stickiness imparted thereto.

18. The process, consising of taking a base of non-oxidizing adhesive material, and combining it by heat with a hardening and toughening mass, and with a gummy elastic mass, and maintaining the heat until any oxidizing tendency of the latter is permanently overcome.

19. The process, consisting of taking a base of non-oxidizing adhesive material, and combining it by heat with a resinous hardening mass, and a gummy elastic mass, and maintaining the heat until any oxidizing tendency of the latter is permanently overcome and a permanent stickiness imparted thereto.

20. The process, consisting of taking a base of non-oxidizing adhesive material, and combining it by heat with a mineral tar and rosin, and a gummy elastic mass, and maintaining the heat until any oxidizing tendency of the latter is permanently overcome and a permanent stickiness imparted thereto.

21. The process, consisting of taking a predominating quantity of wax tailings, and reinforcing the same under heat with a vegetable elastic gum.

22. The process, consisting of taking a predominating quantity of wax tailings, and stearin pitch, and reinforcing the same under heat with a vegetable elastic gum.

23. The process, consisting of taking a base of non-oxidizing adhesive material, combining it by heat with a gummy elastic mass, and maintaining the heat until a thorough disintegration of the gummy mass is effected, whereby any oxidizing tendency of such mass is removed or overcome and consequently permanent stickiness is imparted thereto.

24. The process, consisting of taking a base of non-oxidizing adhesive material, combining it by heat with a gummy elastic mass, and maintaining the heat until a thorough disintegration of the gummy mass is effected, whereby a permanent stickiness is imparted to said gummy mass.

25. The process, consisting of taking a base of non-oxidizing adhesive material, combining it by heat with a resinous hardening mass and a gummy elastic mass, and maintaining the heat until the gummy mass has become thoroughly disintegrated whereby any oxidizing tendency of such mass is permanently overcome and a permanent stickiness imparted thereto.

In testimony whereof, I have signed my name to this specification, in the presence of two subscribing witnesses.

ANDREW THOMA.

Witnesses:
    GEO. H. MAXWELL,
    EDWARD MAXWELL.